INVENTOR.
Edward N. Rein and
Robert E. Dolman
BY
Attorney

Sept. 27, 1966   E. N. REIN ETAL   3,275,330
HIGH PRESSURE SHAFT SEAL AND METHOD OF SEALING A ROTATING
SHAFT USING PROPORTIONED SEALING RINGS
Filed July 16, 1962   2 Sheets-Sheet 2
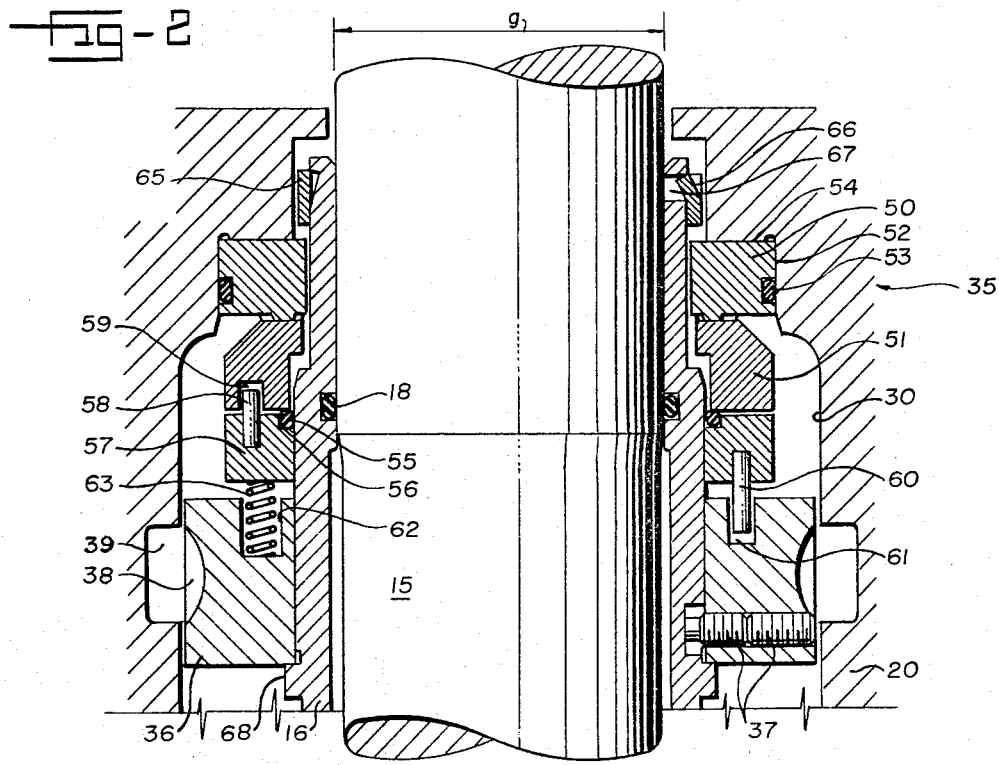
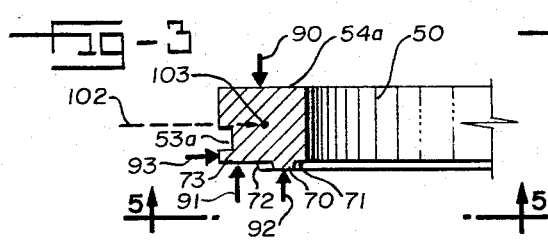
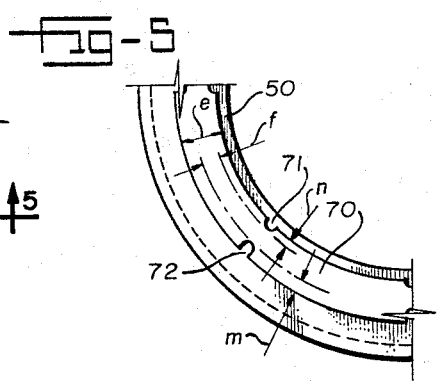
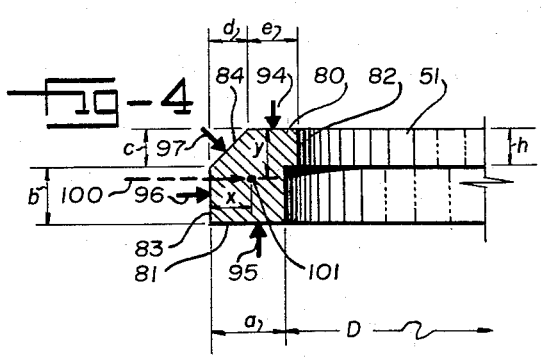
*INVENTOR.*
Edward N. Rein and
Robert E. Dolman
BY
*Lee R. Schermerhorn*
Attorney

United States Patent Office

3,275,330
Patented Sept. 27, 1966

3,275,330
HIGH PRESSURE SHAFT SEAL AND METHOD OF SEALING A ROTATING SHAFT USING PROPORTIONED SEALING RINGS
Edward N. Rein, Portland, Oreg., and Robert E. Dolman, Newark, Del., assignors to Guy F. Atkinson Company, Portland, Oreg., a corporation of Nevada
Filed July 16, 1962, Ser. No. 210,140
2 Claims. (Cl. 277—1)

This invention relates to improvements in a high pressure shaft seal of the type where a rotating sealing ring is held in end face contact with a stationary sealing ring.

This end face type of seal has proved to be very effective and has been widely adopted but difficulties have been encountered under high pressures and particularly under variable high pressures. Excessive leakage and erratic performance have been experienced, even with the highest possible manufacturing precision, which have been difficult to account for.

The underlying theory of the present invention is that such seal failures and erratic performance have resulted from distortion of the sealing rings under high fluid pressures. In some cases damage and deterioration of the contacting surfaces has occurred, reducing the effectiveness of the seal and resulting in a high rate of leakage. In other cases the contacting faces, even though distorted, have apparently worn in to a good fit with the result that the seal has remained effective and the distortion has not been discovered.

According to the present theory the distortion varies with the fluid pressure in conventional seal rings. When the pressure is relatively constant the distortion is constant and the rings have an opportunity to wear in to fit one another and adjust themselves to their distorted shapes. However, when the pressure is variable the degree of distortion is variable and the rings do not have an opportunity to wear in so as to fit each other. This latter condition becomes evident when a seal, after allowing initial leakage upon the application of high pressure, gradually leaks less and less as the contacting faces conform to each other until the seal becomes reasonably effective. Then, when the pressure is reduced, the leakage increases. It is believed that such variations in the performance of the seal are the direct result of the changes in shape of the seal rings under varying values of pressure.

Objects of the present invention are, therefore, to provide a more effective high pressure seal, to provide a seal which will remain effective under variations in pressure, to provide seal rings having contacting faces which will stay flat when pressure is applied, to provide a face design that prevents a track from forming which can change the balance characteristics, and to provide an improved support and mounting arrangement to minimize adverse distortion in a seal ring.

More specifically, an object of the present invention is to provide seal rings in which the surfaces exposed to fluid pressure are so disposed and proportioned that all the forces acting on the rings are balanced in such a way as to minimize adverse distortion.

In the present seal rings, the surfaces exposed to fluid pressure are so related to each other and to the external restraining forces that there is no appreciable unbalance of forces in directions tending to distort the contacting faces out of a true flat condition in a radial plane perpendicular to the axis of rotation. When this is accomplished the characteristics of the seal theoretically do not change under pressure regardless of the magnitude of the pressure, and do not change with variations in pressure. The original manufacturing precision is retained under high pressure conditions and also under variations in pressure. It must be recognized that high precision manufacture is of little value if distortion occurs under operating conditions.

In addition to pressure balance, another important feature of the invention is a novel slotted face arrangement to prevent formation of a track which could alter the intended balance characteristics.

The invention will be better understood and additional objects and advantages will become apparent from the following detailed description of the preferred embodiment illustrated in the accompanying drawings. It is to be understood, however, that the parts may take other shapes and forms and that all such modifications within the scope of the appended claims are included in the invention.

In the drawings:

FIGURE 2 is an enlarged view of the present seal taken on the line 2—2 of FIGURE 1;

FIGURE 3 is a fragmentary sectional view of the stationary sealing ring with force vectors applied;

FIGURE 4 is a similar view of the rotating sealing ring with force vectors applied; and FIGURE 5 is a fragmentary view taken on the line 5—5 of FIGURE 3.

FIGURE 1 shows a high pressure centrifugal pump for a hot liquid as a typical environment for the present seal but the seal is not limited to use in pumps. It has application wherever leakage of fluid along a rotating shaft is to be prevented and, particularly, under high fluid pressures or variable pressures where conventional seals are not effective.

Figure 1:
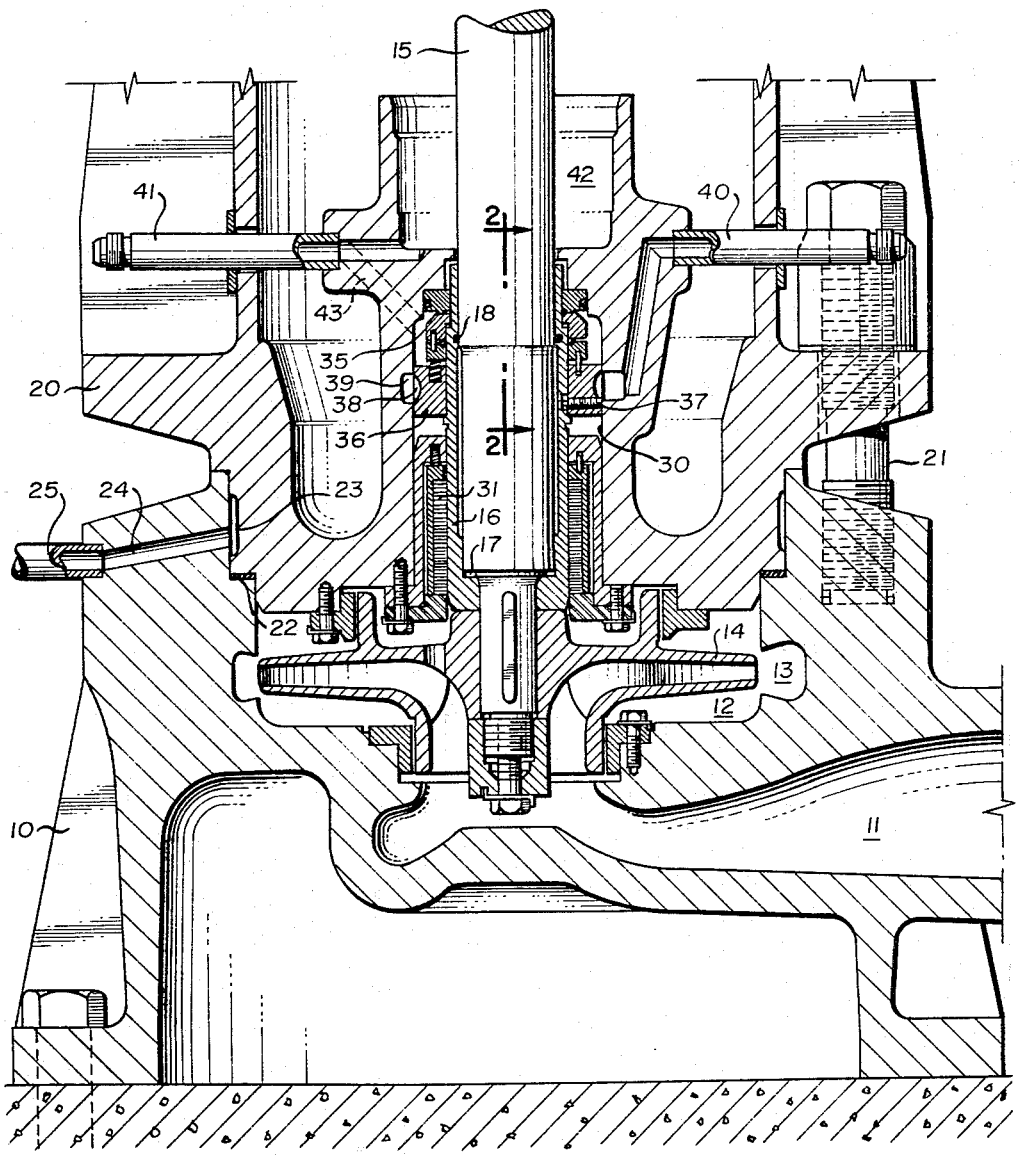
FIGURE 1 is a fragmentary longitudinal sectional view of a centrifugal pump having a shaft seal embodying the principles of the invention.

A base or lower housing member 10 is provided with cavities to form an inlet passage 11 leading to an impeller chamber 12. Surrounding the impeller chamber is a volute discharge passage 13 leading to a discharge connection, not shown. Within the pump is an impeller 14 mounted on the lower end of shaft 15. The upper end of shaft 15 is connected with a motor, not shown, or other suitable means of rotation for turning the impeller at a relatively high speed. In the present pump the inlet 11 is itself under pressure and the impeller raises this inlet pressure still higher whereby a pressure in the order of fifteen hundred pounds per square inch or higher may exist in the pump chamber. Only a slightly lower pressure exists behind the impeller tending to produce leakage upward along the shaft 15. Secured to the shaft above the impeller is a sleeve 16 containing a high temperature gasket 17 and a resilient O-ring 18 whereby leakage is prevented between the sleeve and shaft.

Fitting into the base member 10 is an upper housing member 20 which is secured by a plurality of screws 21. The joint between the two members is sealed by a gasket 22, any leakage past this seal escaping into an annular passage 23. A port 24 communicates with passage 23 and is connected with a pipe 25 for the purpose of leakage detection.

Upper housing member 20 is formed with a bore 30 which contains at its lower end a floating throttle bushing 31 surrounding the lower end of sleeve 16. The upper end of bore 30 contains the present seal which is designated generally by the numeral 35 in FIGURE 1. Seal 35 is designated as a primary seal and throttle bushing 31 is designated as a secondary seal. Under normal operation the secondary seal will pass appreciable leakage whereby the primary seal must be constructed to withstand substantially the maximum rated pressure of the pump.

The lowermost element of the seal 35 is a pumping disc 36 which is secured to the sleeve 16 by setscrews 37. The pumping disc is equipped with vanes 38 to discharge liquid from the bore 30 into an annular recess 39 which is connected with a discharge pipe 40. The liquid from pipe 40 is passed through a cooler, not shown, and returned to the pump housing through a similar pipe, not shown, and through a passage 43 to the upper end of bore 30 in proximity to the sealing rings of the seal 35. Seal 35 is thereby cooled so that the seal will operate at a lower temperature than that of the pumped liquid. A pipe 41 is connected with leakage chamber 42 for disposing of the primary seal leakage.

Referring now to FIGURE 2. the seal 35 comprises a stationary seal ring 50 and a rotating seal ring 51. The ring 50 is seated in the upper end of a reduced cylindrical bore 52 at the upper end of the bore 30. Leakage between ring 50 and housing member 20 is prevented by a resilient O-ring 53 in a groove close to the lower edge of ring 50. The upper surface of ring 50 and its seat 54 in housing member 20 are lapped flat to provide a broad and true flat base for the rigid support of this ring in a radial plane perpendicular to the shaft. Sleeve 16 rotates with clearance in the ring 50.

Rotating seal ring 51 is entirely supported adjacent its inside edge on a resilient O-ring 55 protruding upward from an annular recess 56 in the inside edge of a compression ring 57. Compression ring 57 carries pins 58 projecting upward into holes 59 in the underside of ring 51 to rotate the ring 51. Holes 59 are somewhat bigger in depth and diameter than the protruding portions of pins 58 so that the pins do not hamper the mating and fitting of the top flat face of ring 51 to the bottom flat face on stationary ring 50 as will presently be described. The O-ring 55, which is preferably an elastomer, is crowded into sealing engagement with sleeve 16 as well as the bottom surface of ring 51 to prevent leakage between ring 51 and sleeve 16.

The underside of compression ring 57 is equipped with a plurality of pins 60 which similarly engage loosely in holes 61 in the upper side of pumping disc 36. Thus, the pumping disc 36 drives the compression ring 57 and the latter drives the sealing ring 51 to rotate with the shaft. Between the pin holes 61 in pumping disc 36 are a plurality of spring holes 62 with springs 63 bearing against the underside of compression ring 57. The upward thrust of these springs is applied to sealing ring 51 entirely through the resilient O-ring 55. The ring 51 never directly contacts the ring 57. Compression ring 57 has a sliding fit on sleeve 16 while sealing ring 51 has a small clearance space between its inside surface and the sleeve. Sealing ring 51 is centered on the sleeve by the close clearance between sleeve 16 and ring 51.

A retainer ring 65 holds the parts in assembled relation on sleeve 16 so that the whole assembly may be withdrawn as a unit from the bore 30 and from the shaft. Retainer ring 65 is equipped with tabs 66 which are bent into holes 67 in the upper end of the sleeve. It will be noted that the retainer ring 65 is spaced a short distance above the stationary sealing ring 50 in FIGURE 2 whereby this retainer ring has no function when the parts are assembled. The downward reaction of springs 63 is assumed by a shoulder 68 on the sleeve 16 whereby this shoulder serves to locate the vertical position of the pumping disc. Thus, when the sleeve 16 is removed, the springs thrust ring 50 up against the retaining ring and the pumping disc and ring assembly are confined on the sleeve between shoulder 68 and retaining ring 65.

Further details of construction of the sealing rings 50 and 51 are shown in FIGURES 3, 4 and 5. The upper surface of stationary ring 50 is designated 54a and the groove for O-ring 53 is designated 53a. The lower surface has a land contact face 70 provided with a plurality of pairs of inner and outer slots 71 and 72. The top surface 54a and bottom land face 70 are lapped flat and parallel with each other with a high degree of precision. Extending outward from the landed contact face 70 is an additional area of bottom surface 73. For the purpose of calculating fluid pressure forces acting on the various surfaces of the ring 50, the effective width of the land face 70, which is in sealing contact with ring 51, is the distance between the inner ends of the slots 71 and 72 as indicated by the dimension $f$ in FIGURE 5.

The rotating ring 51 has an upper contact face 80 which is also lapped flat with a high degree of precision. This ring preferably has an L-shaped cross section whereby the top face 80 extends radially inward beyond the inner margin of the bottom surface 81. This extension may be designated as a flange portion 82. This extension permits O-ring 55 to be positioned under an intermediate portion of the contact face 80 for proper vertical pressure balance. Also exposed to fluid pressure on the ring 51 are an outer vertical cylindrical surface 83 and a beveled corner surface 84.

The width of upper face 80 is the same as the overall width of lower land face 70 on ring 50 as will be noted by the identical dimensions $e$ in FIGURES 4 and 5. Slots 71 and 72 give improved wear control on these faces, eliminating grooves in tracking which could disturb the fluid pressure balance presently to be described. Stationary ring 50 is preferably made of a relatively soft bearing material such as bronze while the rotating ring 51 is preferably made of a very hard material such as tungsten carbide.

Force vectors 90–97 indicate the external forces acting on the two rings 50 and 51. Force arrow 90 represents the reaction of the end surface 54 in the bore 52 of housing member 20 which prevents the stationary ring 50 from moving upward. The forces tending to move the ring upward are fluid pressure acting on the surface 73 as represented by force arrow 91 and a combination of fluid pressure and spring pressure acting on the land face 70 as represented by the force arrow 92. The horizontal force arrow 93 represents the force of fluid pressure acting radially on that portion of ring 50 below the effective sealing point of O-ring 53. This force is resisted by the strain reaction of the material of the ring and, since fluid pressure does not reach the inside of ring 50, a counteracting horizontal force arrow is not indicated.

Force arrow 94 acting downward on the rotating ring 51 is in part the reaction force from land face 70 of the stationary ring 50 and in part a fluid pressure force acting on the top face 80. Fluid pressure acting on the inclined surface 84 exerts a force 97 which has both horizontal and vertical components. The upward forces represented by force arrow 95 consist of the force of springs 63 plus the fluid pressure acting on the bottom surface 81. The total upward force must exceed the downward fluid pressure force in order to hold the seal closed. The horizontal fluid pressure force 96 and the horizontal component of force 97 are both resisted by strain reactions developed in the material of the ring whereby no opposing horizontal force is shown applied to the inside of the ring which is not exposed to fluid pressure.

The following dimensions are given as illustrative for the rotating ring 51 for use on a 3⅞ inch diameter shaft. On larger or smaller shafts the dimensions may be varied in conformity with the theory of the invention. Also, it is to be understood that the illustrated cross sectional shapes of the rings 50 and 51 are not essential to the practice of the invention. The present cross sectional shapes were selected to facilitate computations in locating their centroids and the position and direction of the resultant forces. More elaborate shapes may be employed but this would make the computations more complicated. The following values are taken from a seal as shown which has operated successfully according to the theory of the invention:

|   | Inch |
|---|---|
| a | 0.492 |
| b | 0.437 |
| c | 0.250 |
| d | 0.250 |
| e | 0.406 |
| f | 0.212 |
| g | 3.875 |
| h | 0.312 |
| m | 0.125 |
| n | 0.069 |
| x | 0.307 |
| y | 0.340 |
| D | 4.640 |

Total spring force 70 pounds.

The drawings are made to scale whereby the unspecified dimensions of the stationary ring 50 may be obtained by scaling the distances in FIGURE 3 and comparing them with the dimensions given in FIGURE 4, both views being drawn to the same scale. It will be noted that the only dimensions of the stationary ring which are directly related to those of the rotating ring 51 are the dimensions controlling the width and position of the land surface 70, the dimension e in FIGURE 5 being the same as the dimension e in FIGURE 4 and the inner and outer edges of faces 70 and 80 having the same diameters for registering superposition as shown in FIGURE 2. The designated dimensions are given by way of example only and are not intended to limit the invention. These values may be varied in conformity with the theory of the invention. Also, the spring force is not cricital.

In FIGURE 4, considering the shaded cross sectional portion of elemental length of the ring 51 as a free body, the resultant of the external forces 94, 95, 96 and 97 is indicated by the force vector 100. Ideally, according to the theory of the invention, this vector should be horizontal or perpendicular to the axis of generation of the annulus of the ring 51. Also, it should pass through the centroid 101 of the section. When these two conditions are fulfilled, distortion from the external forces is minimized. In other words, the ring responds to a radially directed resultant force 100 through the centroid 101 by shrinking in diameter without rotation of the section around its centroid. If the section does not rotate, the contact face 80 remains flat and in a plane perpendicular to the axis of the shaft. This is the desired condition to be accomplished.

In practice, the resultant 100 need not pass precisely through the centroid of the section but, as the resultant departs from intersection with the centroid, the section tends to rotate with the result that the contact face 80 does not remain flat. As a matter of practice it has been found that the resultant may be spaced as much as .006 inch from the centroid, with the present dimensions, without producing objectionable distortion in the face 80 under a fluid pressure in the order of two thousand pounds per square inch. Within this distance the resultant may be said to pass approximately or substantially through the centroid for the purposes of the invention. Under higher pressures the resultant should approach more closely the ideal conditions. The invention is not limited to any particular pressure or range of pressures, however.

In locating the resultant 100 it is first necessary to find the position of the centroid 101. This calculation gives the x and y values. Then the moments of the forces tending to produce clockwise rotation of the section about centroid 101 are calculated and added together. In the present example these forces are 94 and 97. Then the moments of the forces tending to produce counter-clockwise rotation about centroid 101 are calculated and added together. These are forces 95 and 96. In practice the clockwise and counterclockwise moments are added algebraically in a single operation.

If the clockwise and counterclockwise moments are exactly in balance, there is no tendency for the section to rotate and the resultant 100 passes through the centroid in a radial direction. When the clockwise and counterclockwise moments are not exactly in balance, the radial resultant will pass above or below the centroid, causing rotation of the section and changing the flat surface 80 to conical shape. This unbalanced moment is resisted by strain in the material. The moment arm, or deviation, is obtained by dividing the resultant moment by the resultant force.

With the given dimensions the permissible deviation of .006 inch is equivalent to .00107 diameters, this reference being to the outside diameter of ring 51 which is, in the present example, D plus 2a or 5.625 inches. The tolerance distance .006 divided by 5.625 equals .00107. This ratio provides a basis of comparison with larger and smaller rings.

The same considerations apply to the stationary ring 50, although distortion here presents a less serious problem. In the first place, substantially the whole area of top face 54a is rigidly supported by the mating face 54 of the housing member 20. In the second place, radial forces are preferably minimized by positioning the O-ring 53 as close as practicable to the bottom surface 73.

The ideal condition in FIGURE 3 is represented by the resultant 102 acting in a true horizontal direction through the centroid 103 of the section. In this case the vector 102 represents the resultant of the applied fluid pressure, spring and reaction forces 90, 91, 92 and 93. In any event, the rigid flat support provided by surface 54 so reduces distorting response to a resultant which departs from the ideal that when the cross section of ring 50 is proportioned approximately as shown in FIGURE 3, the problem of distortion is not as serious as the problem inherent in the rotating ring. Preferably, however, the departure of the resultant from the centroid should not exceed .006 inch for the dimensions and pressure given. Since ring 50 has a sliding fit in bore 52 there is room in the bore for symmetrical barrel-shaped distortion under the principal compressive forces 91 and 92 and reaction 90 without distorting face 70. The resultant 102 is located in the same manner as resultant 100.

The major requisites for the stationary ring 50 are, therefore, to provide a flat supporting face for as much of the top surface 54a as possible and approaching the inner and outer diameters of the ring as closely as possible, to position the O-ring 53 as close to the bottom surface of ring 50 as practicable, to allow clearances for symmetrical barrel-shaped distortion of the section, and to proportion the cross section so that resultant 102 will pass through the centroid 103. When these conditions are satisfied, the shape and dimensions of ring 50 may be varied as desired. The present near square shape has the desirable qualities of being compact, easy to manufacture and easy to calculate.

Having now described our invention and in what manner the same may be used, what we claim as new and desire to protect by Letters Patent is:

1. A method of sealing a rotating shaft penetrating a fixed housing against egress from said housing of fluid under high, variable pressure, said method comprising: providing a first ring secured and sealed to said housing and coaxial with said shaft; providing a second ring surrounding said shaft, supporting said second ring adjacent its inside edge on a resilient O ring, said second ring being movable axially thereof and having an annular surface confronting a meeting surface on said first ring; urging said surfaces into contact by the application of resilient mechanical force; subjecting selected portions of the surface of both said rings to the high, variable pressure of the fluid to be restrained against egress from said housing; and selecting the contours and proportions of at least said second ring so that in each radial cross-section of said second ring the resultant of all external forces acting on said second ring passes substantially radially inwar and substantially through the centroid of the radial cross-section of said second ring.

2. A shaft seal comprising a stationary ring and a rotating ring in end face mutual contact, a compression ring behind said rotating ring, an abutment ring behind said pressure ring, axial pins projecting from opposite sides of said compression ring, holes in said rotating ring and abutment ring receiving said pins, compression springs between said abutment ring and compression ring, and a resilient ring interposed between the inner edges of said compression ring and rotating ring, said seal including a shaft sleeve extending through said rings, a shoulder on said sleeve engaging the back side of said abutment ring, driving means connecting said abutment ring with said sleeve, and a retaining ring on said sleeve behind said stationary ring for hold-all of said rings on said sleeve.

References Cited by the Examiner

UNITED STATES PATENTS

| | | | |
|---|---|---|---|
| 2,723,868 | 11/1955 | Hartranft | 277—81 |
| 2,824,759 | 2/1958 | Tracy | 277—15 |
| 3,052,475 | 9/1962 | Carfogna | 277—93 |
| 3,069,176 | 12/1962 | Woodcock et al. | 277—74 |

FOREIGN PATENTS

| | | |
|---|---|---|
| 737,230 | 10/1932 | France. |
| 1,237,697 | 6/1960 | France. |

LAVERNE D. GEIGER, *Primary Examiner.*

SAMUEL ROTHBERG, *Examiner.*

E. DOWNS, J. MEDNICK, *Assistant Examiners.*